United States Patent
Taniguchi

(10) Patent No.: US 9,912,889 B2
(45) Date of Patent: Mar. 6, 2018

(54) IMAGE PICKUP APPARATUS AND ITS CONTROL METHOD

(71) Applicant: CANON KABUSHIKI KAISHA, Tokyo (JP)

(72) Inventor: Hidenori Taniguchi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/995,388

(22) Filed: Jan. 14, 2016

(65) Prior Publication Data

US 2016/0173795 A1  Jun. 16, 2016

Related U.S. Application Data

(63) Continuation of application No. 12/995,938, filed as application No. PCT/JP2009/003149 on Jul. 7, 2009.

(30) Foreign Application Priority Data

Jul. 10, 2008  (JP) .................... 2008-179905

(51) Int. Cl.
| | |
|---|---|
| H04N 5/225 | (2006.01) |
| H04N 5/369 | (2011.01) |
| G02B 7/34 | (2006.01) |
| G03B 13/36 | (2006.01) |
| H04N 5/232 | (2006.01) |

(Continued)

(52) U.S. Cl.
CPC .......... *H04N 5/3696* (2013.01); *G02B 7/34* (2013.01); *G03B 13/36* (2013.01); *H04N 5/23212* (2013.01); *H04N 5/341* (2013.01); *H04N 5/378* (2013.01); *H04N 9/045* (2013.01); *H04N 2101/00* (2013.01)

(58) Field of Classification Search
CPC ... H04N 5/3696; H04N 5/23212; G03B 13/20
See application file for complete search history.

(56) References Cited

U.S. PATENT DOCUMENTS

| | | | |
|---|---|---|---|
| 6,829,008 B1 * | 12/2004 | Kondo et al. ............ | G02B 7/34 348/302 |
| 7,715,703 B2 * | 5/2010 | Utagawa ................. | H04N 9/045 348/345 |

(Continued)

FOREIGN PATENT DOCUMENTS

| | | |
|---|---|---|
| CN | 1835565 A | 9/2006 |
| EP | 1906657 A2 | 4/2008 |
| JP | 2000-156823 A | 6/2000 |

OTHER PUBLICATIONS

The above foreign patent documents were cited in a Aug. 31, 2017 Chinese Office Action, which is enclosed with an English Translation, that issued in Chinese Patent Application No. 201510557867.1.

*Primary Examiner* — Twyler Haskins
*Assistant Examiner* — Dwight C Tejano
(74) *Attorney, Agent, or Firm* — Cowan, Liebowitz & Latman, P.C.

(57) ABSTRACT

There is provided an image pickup apparatus that has a mixture readout mode configured to mix and read outputs of a plurality of pixels in an image sensor (107), when pixels to be mixed are image pickup pixels, they are mixed. When the pixels to be mixed contain a focus detection pixel, a signal of the image pickup pixel is not mixed with a signal of the focus detection pixel.

18 Claims, 10 Drawing Sheets

GR COLUMN

GB COLUMN
MIXTURE READOUT

(51) Int. Cl.
  *H04N 9/04*      (2006.01)
  *H04N 5/341*     (2011.01)
  *H04N 5/378*     (2011.01)
  *H04N 101/00*    (2006.01)

(56)  References Cited

U.S. PATENT DOCUMENTS

| | | | | |
|---|---|---|---|---|
| 2004/0169767 | A1* | 9/2004 | Norita | H04N 5/23212 348/350 |
| 2006/0244841 | A1* | 11/2006 | Ikeda | H04N 9/045 348/222.1 |
| 2007/0236598 | A1* | 10/2007 | Kusaka | G03B 17/00 348/350 |
| 2007/0258706 | A1* | 11/2007 | Raskar | H04N 5/23248 396/52 |
| 2008/0317454 | A1* | 12/2008 | Onuki | G02B 7/08 396/128 |
| 2009/0086084 | A1* | 4/2009 | Komaba | G03B 13/18 348/349 |
| 2009/0096886 | A1* | 4/2009 | Kusaka | H04N 5/23293 348/222.1 |
| 2009/0153720 | A1* | 6/2009 | Suzuki | G06T 11/00 348/333.01 |
| 2009/0213255 | A1* | 8/2009 | Suzuki | H01L 27/14623 348/302 |
| 2010/0302433 | A1* | 12/2010 | Egawa | G02B 7/34 348/345 |
| 2011/0008031 | A1* | 1/2011 | Kusaka | G03B 13/28 396/100 |

* cited by examiner

PLANE VIEW

A-A SECTIONAL VIEW

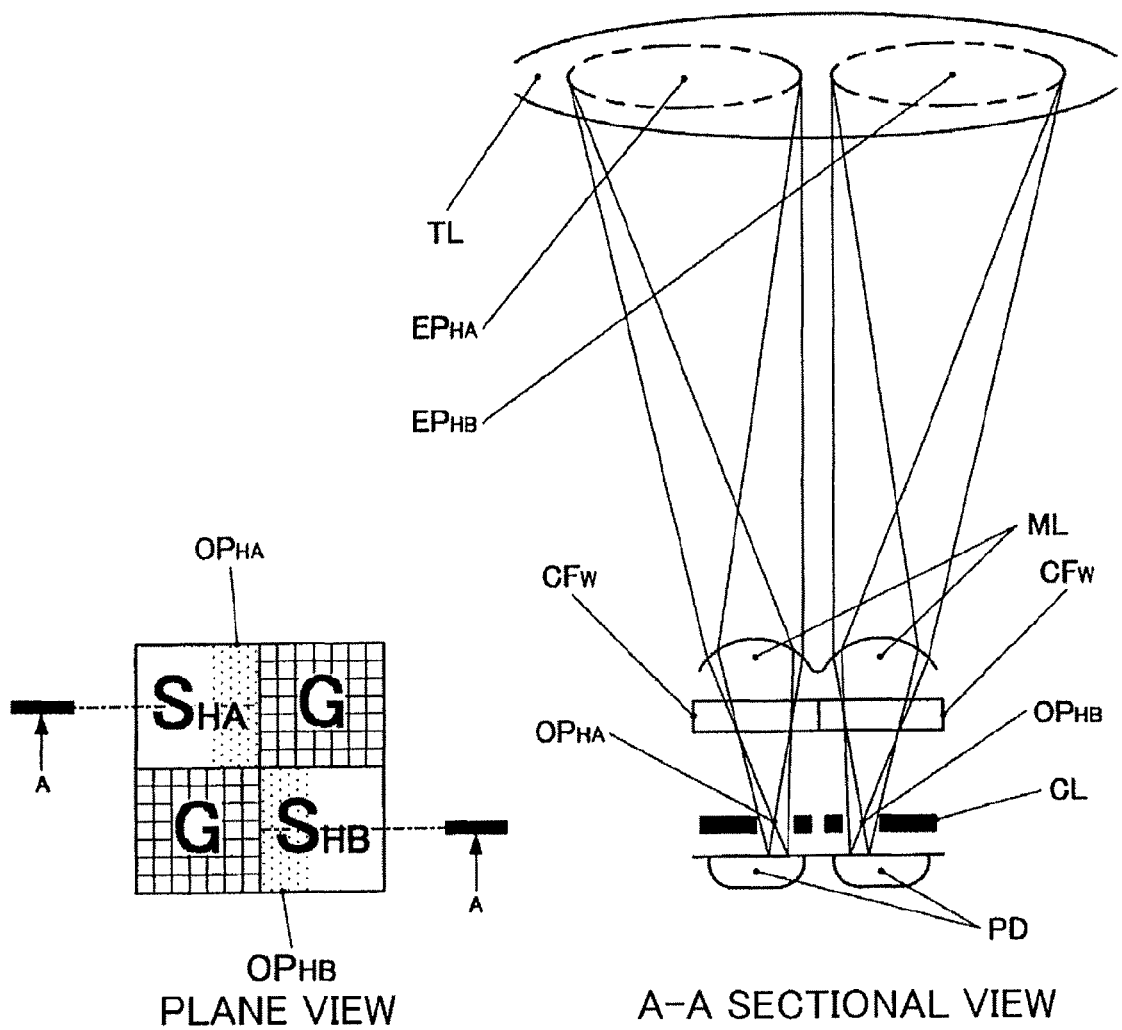
FIG. 4A PLANE VIEW
FIG. 4B A-A SECTIONAL VIEW

A-A SECTIONAL VIEW

PLANE VIEW

FIG. 6

GR COLUMN

GB COLUMN

WHOLE SCREEN READOUT

GR COLUMN

GB COLUMN
SKIP READOUT

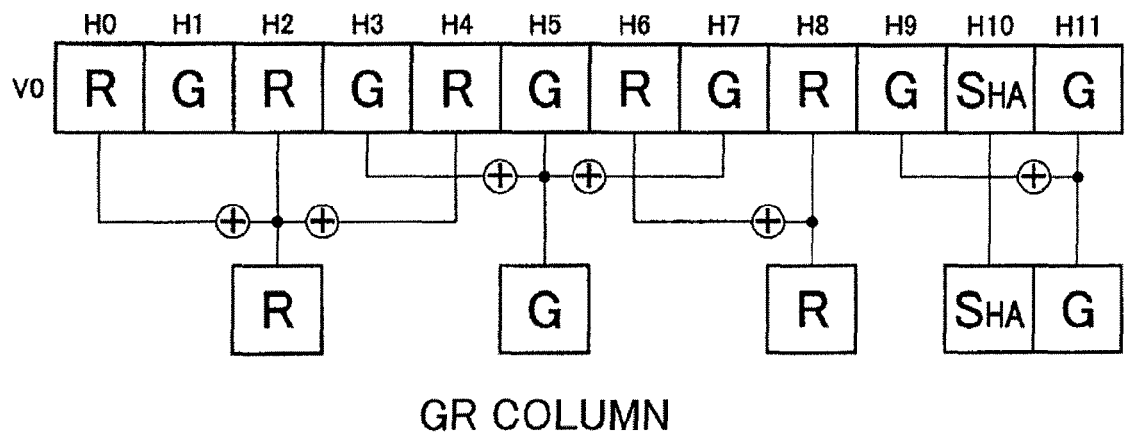
GR COLUMN
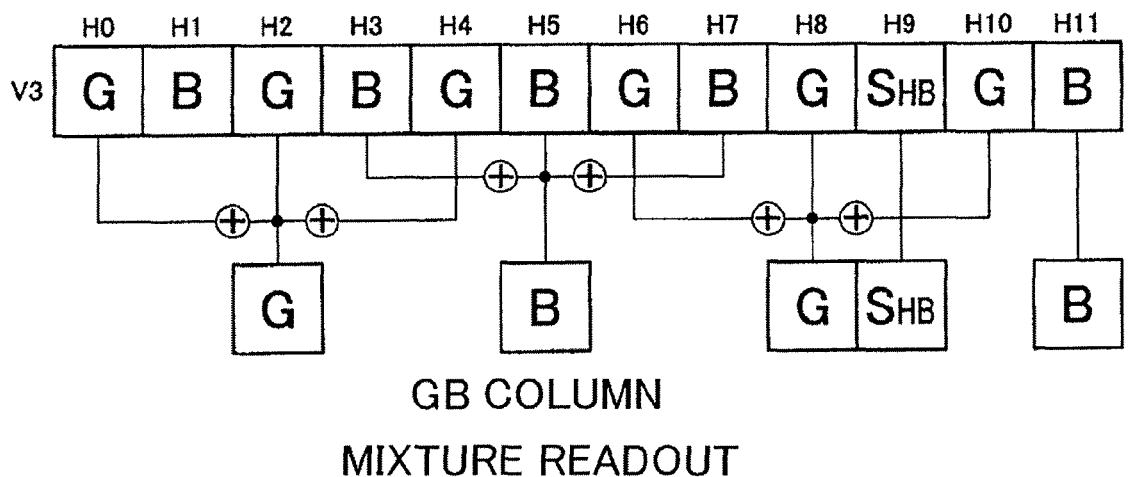
GB COLUMN
MIXTURE READOUT
FIG. 9

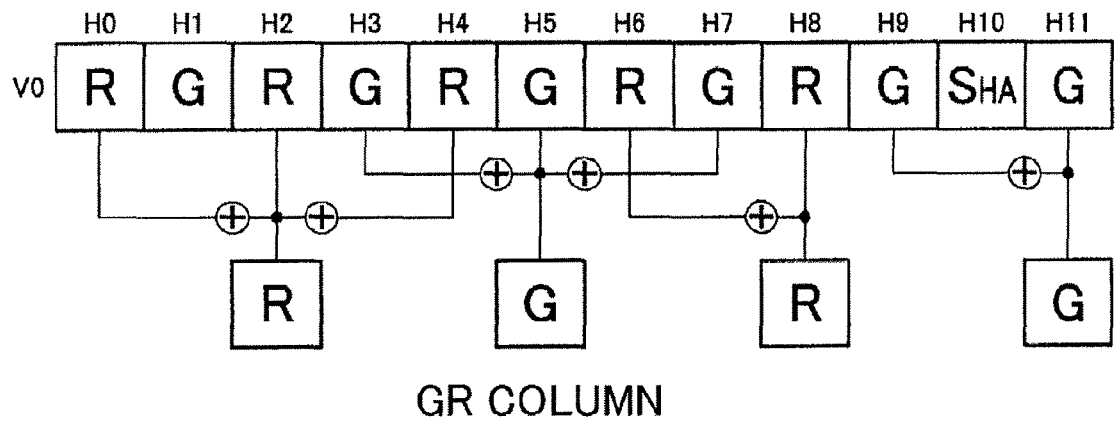
GR COLUMN
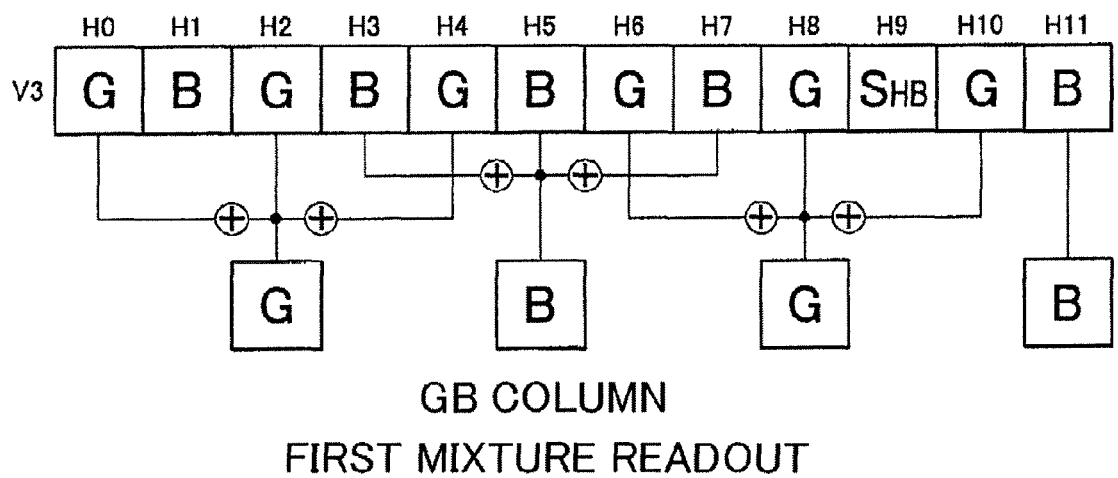
GB COLUMN
FIRST MIXTURE READOUT
FIG. 10

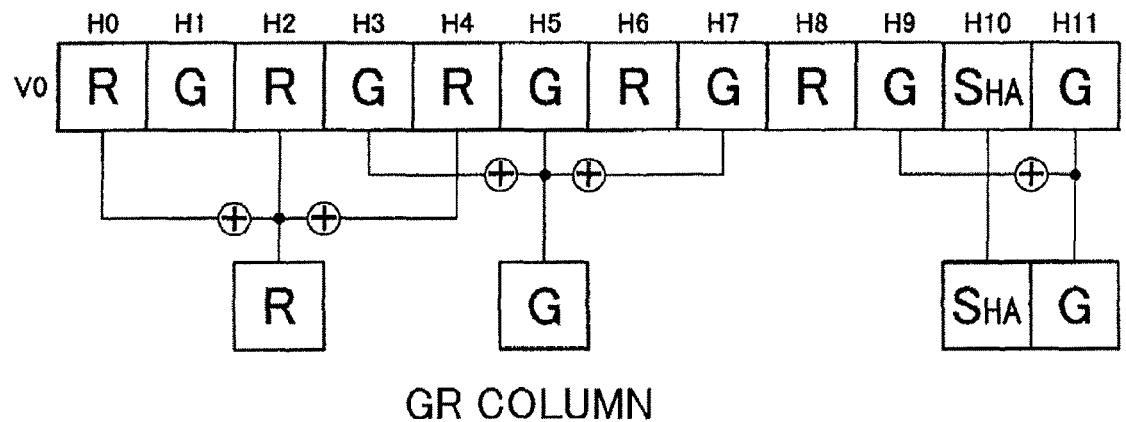
GR COLUMN
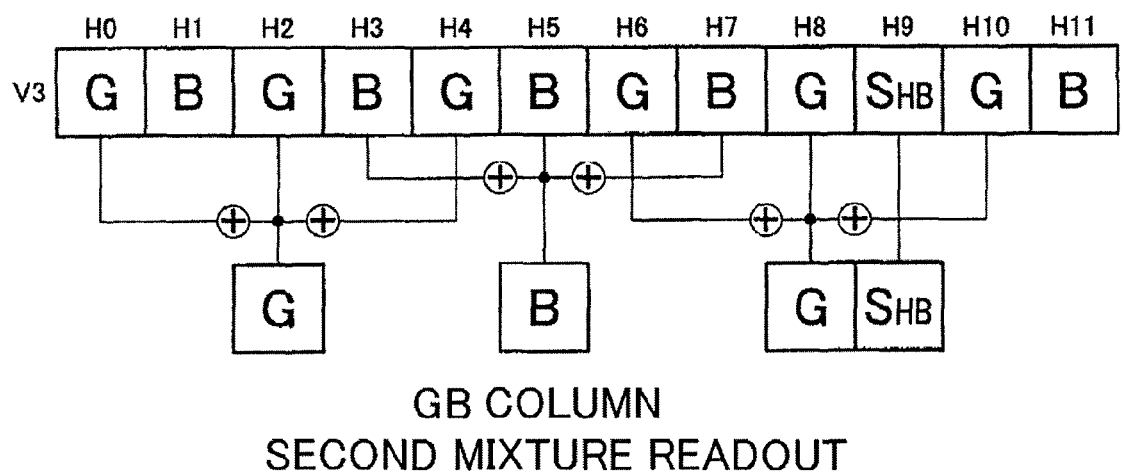
GB COLUMN
SECOND MIXTURE READOUT
FIG. 11

IMAGE PICKUP APPARATUS AND ITS CONTROL METHOD

CROSS-REFERENCE TO RELATED APPLICATIONS

This application is a continuation of application Ser. No. 12/995,938, filed Dec. 2, 2010, which is a national stage application of International Application No. PCT/JP2009/003149, filed Jul. 7, 2009, whose benefit is claimed and which claims the benefit of Japanese Patent Application No. 2008-179905, filed Jul. 10, 2008, whose benefit is also claimed, the entire disclosure of which is hereby incorporated by reference.

TECHNICAL FIELD

The present invention relates to an image pickup apparatus and its control method.

BACKGROUND ART

It is known to perform a phase difference focus detection or autofocus ("AF") by including a focus detection pixel in image pickup pixels in an image sensor. For example, PTL 1, PTL 2, and PTL 3.

In an electronic viewfinder mode or a motion image pickup mode, the frame rate is more important than the image quality.

PTL 4 proposes an image pickup apparatus that arranges no focus detection pixel in the image sensor, and can provide an output by switching a skip readout mode (or a thinning-out readout mode) and a mixture readout mode. Since the mixture readout mode mixes signals of a plurality of pixels and uses the resultant signal, the mixture readout mode can restrain moire that would otherwise occur when an object has a high spatial frequency. The skip readout mode skips signals of some of all pixels, and thus can restrain generations of smears that would otherwise occur due to the high brightness.

CITATION LIST

Patent Literature

[PTL 1]
Japanese Patent Laid-Open No. 2000-156823
[PTL 2]
Japanese Patent Laid-Open No. 2000-292686
[PTL 3]
Japanese Patent Laid-Open No. 2001-305415
[PTL 4]
Japanese Patent Laid-Open No. 2003-189183

SUMMARY OF INVENTION

Technical Problem

It is conventionally impossible for an image pickup apparatus that provides a phase difference AF using an image sensor, to provide the focus detection while a degradation of the image quality is restrained, when an electronic viewfinder mode or a motion image pickup mode is set to this image pickup apparatus. For example, when the skip readout mode is set, PTL 1 cannot provide the phase difference AF because the focus detection pixel is skipped. PTL 2 and PTL 3 are silent about the skip readout. Since PTL 4 includes no focus detection pixels in the image sensor, it cannot provide the phase difference AF using the image sensor. If the mixture readout mode of PTL 4 is simply applied to PTL 1, a focus detection pixel is mixed with an image pickup pixel, and the focus detection pixel disappears. As a result, the focus detection precision deteriorates or the phase difference AF itself becomes unavailable.

The present invention provides an image pickup apparatus and its control method, which can properly read functional pixels, such as an image pickup pixel and a focus detection pixel, when image signals are read out after they are mixed or skipped.

Solution to Problem

An image pickup apparatus according to one aspect of the present invention includes an image sensor that includes a plurality of image pickup pixels and a plurality of pairs of pupil-divided focus detection pixels, and a controller configured to control reading of a pixel signal from the image sensor, wherein the controller controls the reading such that in mixing and reading pixel signals from a plurality of pixels, the pixel signals from a pair of pupil-divided focus detection pixels cannot be mixed with the pixel signals from the image pickup pixels.

Advantageous Effects of Invention

The present invention can provide an image pickup apparatus and its control method, which can properly read pixel outputs from both an image pickup pixel and a focus detection pixel.

BRIEF DESCRIPTION OF DRAWINGS

FIGS. 4A and 4B are views for explaining a structure of an image pickup pixel and a focus detection pixel used for the image sensor shown in FIG. 1.
FIG. 6 is a plan view showing an illustrative arrangement of pixels of the image sensor shown in FIG. 1.
FIG. 7 is a view for explaining whole screen readout in the image sensor (example 1).
FIG. 8 is a view for explaining skip readout in the image sensor (example 1).
FIG. 9 is a view for explaining mixture readout in the image sensor (example 1).
FIG. 10 is a view for explaining first mixture readout (example 2).
FIG. 11 is a view for explaining second mixture readout (example 2).

DESCRIPTION OF EMBODIMENTS

Exemplary examples of the present invention will hereinafter be described with reference to the accompanying drawings.

Example 1

Figure 1:
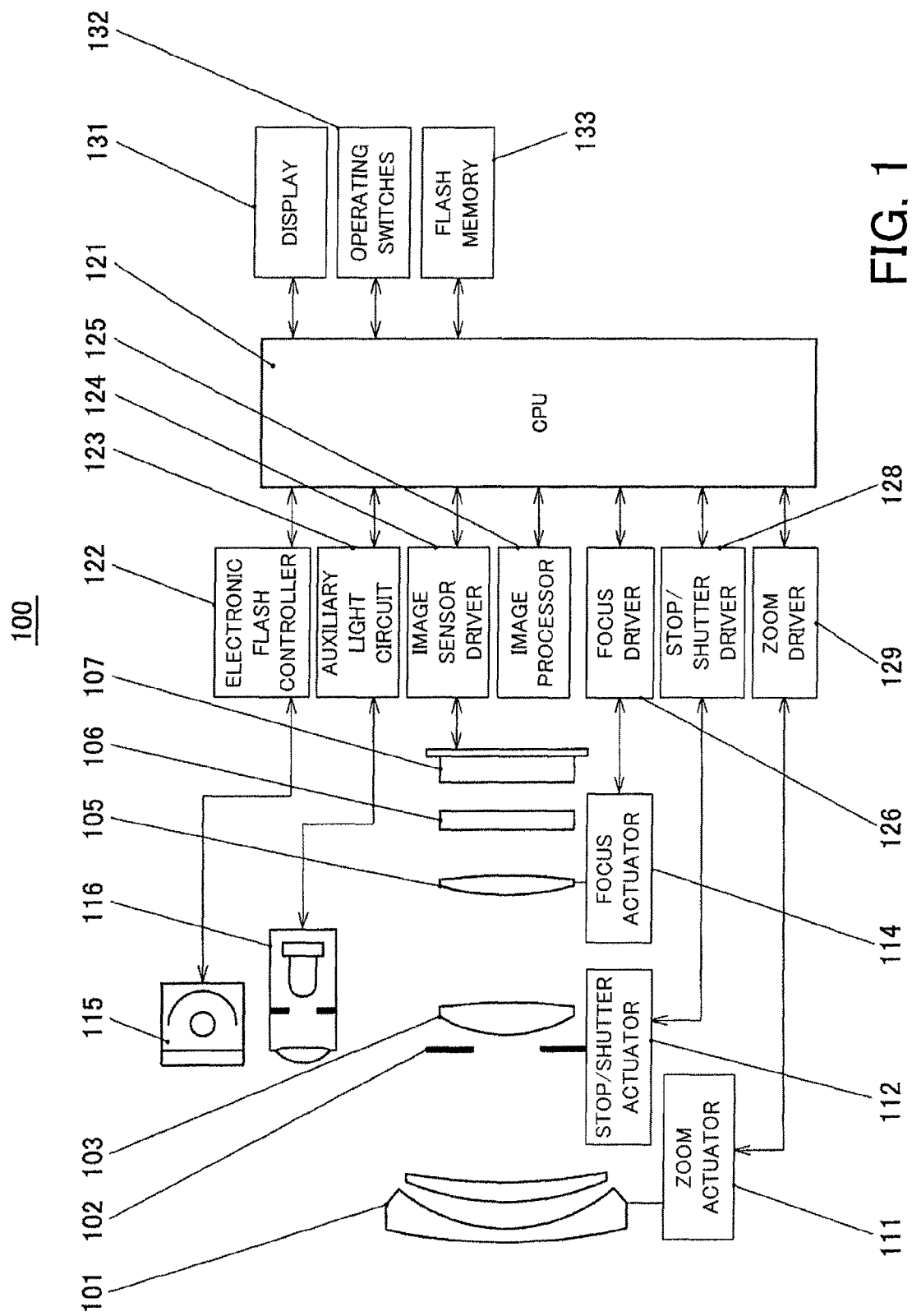
FIG. 1 is a block diagram of a camera (example 1).

FIG. 1 is a block diagram of a digital camera (image pickup apparatus) 100 (example 1).

In FIG. 1, reference numeral 101 denotes a first lens unit located at the top of an image pickup optical system, and held movable in an optical axis direction. Reference numeral 102 denotes a stop/shutter, which adjusts a light quantity at the image pickup time when its aperture diameter is adjusted, and serves as an exposure time adjustment shutter at the still image pickup time. Reference numeral 103 denotes a second lens unit. The stop/shutter 102 and the second lens unit 103 integrally move in the optical axis direction, and provide a magnification variation (zooming) in association with a movement of the first lens unit 101. Reference numeral 105 denotes a third lens unit including a focus lens, which moves in the optical axis direction for focusing. Reference numeral 106 denotes an optical low-pass filter 106, which is an optical element configured to mitigate a false color or moire of a taken image. Reference numeral 107 denotes an image sensor composed of a CMOS sensor and peripheral circuits. The image sensor 107 uses a two-dimensional single-substrate color sensor in which a primary color mosaic filter of a Bayer arrangement is formed as an on-chip arrangement on light-receiving pixels having m pixels in a lateral direction and n pixel in a longitudinal direction. The image sensor 107 includes a plurality of image pickup pixels and a plurality of focus detection pixels.

Reference numeral 111 denotes a zoom actuator configured to rotate a cam cylinder (not shown) and to drive the first lens unit 101 to the third lens unit 103 in the optical axis direction for magnification variations. Reference numeral 112 denotes a stop/shutter actuator, which controls an aperture diameter of stop/shutter 102 for image pickup light quantity, and controls the exposure time at the still image pickup time. Reference numeral 114 denotes a focus actuator configured to drive the third lens unit 105 in the optical axis direction for focusing. Reference numeral 115 denotes an electronic flash configured to illuminate an object at the image pickup time. Reference numeral 116 denotes an AF auxiliary light projection part configured to project a mask image having a predetermined opening pattern onto the field through a light projection lens, and to improve the focus detection ability to a dark object or a low contrast object.

Reference numeral 121 denotes a CPU, which is a controller that governs a variety of controls of the camera body. The CPU 121 possesses a calculating part, a ROM, a RAM, an A/D converter, a D/A converter, and a communication interface circuit, etc., drives a variety of circuits in the camera in accordance with a program stored in the ROM, and executes a series of operations such as the AF, image pickup, image processing, and recording. The reference numeral 122 denotes an electronic flash controller, which controls turning on and off of the electronic flash 115 in synchronization with the image pickup operation. Reference numeral 123 denotes an auxiliary light driver, which controls turning on and off of the AF auxiliary light projection part 116 in synchronization with the focus detection operation. Reference numeral 124 denotes an image sensor driver, which controls the image pickup operation of the image sensor 107, provides an analog-to-digital conversion to the obtained image signal, and sends the resultant signal to the CPU 121. Reference numeral 125 is an image processor, which provides a gamma conversion, a color interpolation, and another process, such as a JPEG compression, to an image obtained by the image sensor 107.

Reference numeral 126 denotes a focus driver, which controls driving of the focus actuator 114 on the basis of a focus detection result under control by the CPU 121, and drives the third lens unit 105 in the optical axis direction for focusing. Reference numeral 128 denotes a stop/shutter driver, which controls driving of the stop/shutter actuator 112, and controls an aperture of the stop/shutter 102. Reference numeral 129 denotes a zoom driver configured to drive the zoom actuator 111 in accordance with a photographer's zoom operation.

Reference numeral 131 denotes a display, such as an LCD, configured to display information on an image pickup mode, a preview image before image pickup, an image for review after image pickup, and a focus state indicating image at the focus detection time, etc. of the digital camera 100. Reference numeral 132 denotes operation switches, such as a power switch, a release (image pickup trigger) switch, a zoom operation switch, and a mode selection switch. The mode selection switch serves as a mode setting part configured to set a still image pickup mode, a motion image pickup mode, and an electronic viewfinder mode. It can set a skip readout mode or a mixture readout mode (or a first mixture readout mode or a second mixture readout mode), which will be described later, in the motion image pickup mode or the electronic viewfinder mode. Reference numeral 133 denotes a detachable flash memory configured to record a captured image.

Figure 2:
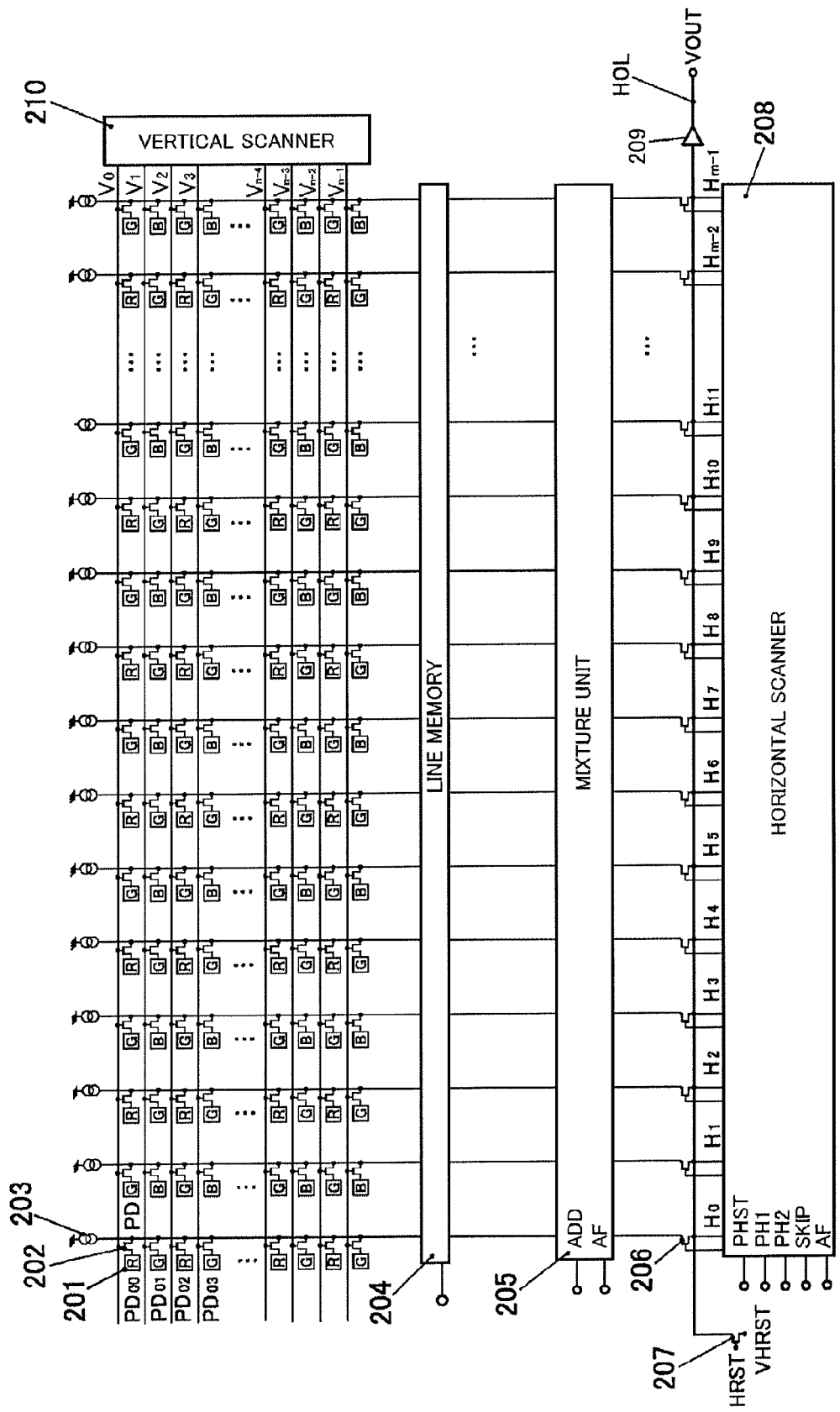
FIG. 2 is a block diagram of an image sensor shown in FIG. 1.

FIG. 2 is a block diagram of the image sensor 107, and shows a minimum structure necessary for an explanation of the following readout operation, omitting a pixel reset signal, etc.

In FIG. 2, reference numeral 201 denotes a photoelectric conversion part, which may be distinguished by "$PD_{mn}$" where m (=0, 1, ... m−1) is an address in an X direction and n (=0, 1, ... n−1) is an address in a Y direction. The photoelectric conversion part 201 has a photodiode, a pixel amplifier, and a resetting switch, etc. The image sensor 107 two-dimensionally arranges m×n photoelectric conversion parts 201. For convenience, only upper left photoelectric conversion parts $PD_{00}$-$PD_{03}$ are labeled. R, G, and B added to the photoelectric conversion parts 201 indicate color filters, and the color filters are arranged to form the Bayer arrangement.

Reference numeral 202 denotes a switch that selects an output of the photoelectric conversion part 201, and is selected every line by a vertical scanner 210. Reference numeral 203 denotes a constant current generator that becomes a load to a pixel amplifier (not shown) of the photoelectric conversion part 201, and is arranged in each vertical output line. Reference numeral 204 denotes a line memory configured to temporarily memorize an output of the photoelectric conversion part 201. The line memory 204 stores the outputs of the photoelectric conversion parts 201 for one line selected by the vertical scanner 210. Usually, the line memory 204 uses a capacitor.

Reference numeral 205 denotes a mixture unit configured to mix signals of a plurality of pixels in the horizontal direction. The mixture unit 205 is used to mix the signals of the pixels in the horizontal direction in the following mixture readout, and controlled by two control signals to be input to an ADD terminal and an AF terminal. The control signal supplied to the ADD terminal is a signal that selects one of the mixture and the non-mixture, or selects the non-mixture when the control signal at L level is input and the mixture when the control signal at H level is input. The AF terminal is an input terminal used to selectively read the focus detection pixels (focus detection pixel group) included in the image sensor 107 with no mixture. The example 1 does not use the AF terminal, and a detailed description will be given later in the example 2. The mixture unit 205 functions as a selector configured to select a signal of an output pixel, similar to the horizontal scanner 208.

Reference numeral 206 denotes a switch that sequentially outputs the outputs of the photoelectric conversion parts 201 stored in the line memory 204 to the horizontal output line HOL. The horizontal scanner 208 sequentially scans $H_0$ to $H_{m-1}$ switches 206, and reads the outputs of the photoelectric conversion parts for one line. Reference numeral 207 denotes a switch connected to the horizontal output line HOL, configured to reset the horizontal output line HOL to potential VHRST, and controlled by a signal HRST.

The horizontal scanner 208 sequentially scans the outputs of the photoelectric conversion parts 201 memorized in the line memory 204, and outputs them to the horizontal output line HOL. The horizontal scanner 208 can also serve as a selector configured to select a necessary pixel through the control of the CPU 121. A PHST terminal is a data input terminal of the horizontal scanner 208. A PH1 terminal and a PH2 terminal are shift clock input terminals, and H-level data input to the PHST terminal is set to the PH1 terminal and latched by the PH2 terminal. When shift clocks are input to the PH1 terminal and the PH2 terminal, the signals input to the PHST terminal are sequentially shifted so as to drive the horizontal scanner 208 and the $H_0$ to $H_{m-1}$ switches 206 are sequentially turned on. A SKIP terminal is a control input terminal configured to allow setting of the horizontal scanner 208 at the following skip readout or mixture readout time. When the SKIP terminal is set to the H level, a pixel output of the horizontal scanner 208 can be skipped and read out in the horizontal direction by skipping scans of the horizontal scanner 208 at a predetermined interval, such as H2, H5, H8, . . . . The readout is provided with a different skip period by setting the AF terminal in combination with the SKIP terminal. A detailed description of the readout operation will be given later.

Reference numeral 209 denotes a buffer amplifier for an image signal sequentially output from the horizontal output line HOL. Reference numeral 210 denotes a vertical scanner configured to select the switch 202 of the photoelectric conversion part 201 by sequentially scanning and outputting $V_0$ to $V_{n-1}$. Similar to the horizontal scanner 208, a control signal is controlled with a data input terminal PVST (not shown), shift clock input terminals PV1 and PV2 (not shown), and a SKIP terminal (not shown) for setting of the skip readout. Since its operation is similar to the horizontal scanner 208, a detailed description thereof will be omitted. For simplification, a description of a mixture function in the vertical direction will be omitted.

FIGS. 3 and 4 are views for explaining structures of the image pickup pixels and the focus detection pixels. This example provides a plurality of focus detection pixels each of which receives the light that passes part of an area of the exit pupil in the image pickup optical system. This example adopts a Bayer arrangement in which two pixels each with a G (green) spectral sensitivity are diagonally arranged and two other pixels of R (red) and B (blue) spectral sensitivities are diagonally arranged in four (2 columns×2 rows) pixels. Hereinafter, X denotes the column and Y denotes the row and 2 columns×2 rows is expressed as 2×2. The following focus detection pixels are dispersed in the Bayer arrangement.

Figures 3A, 3B:
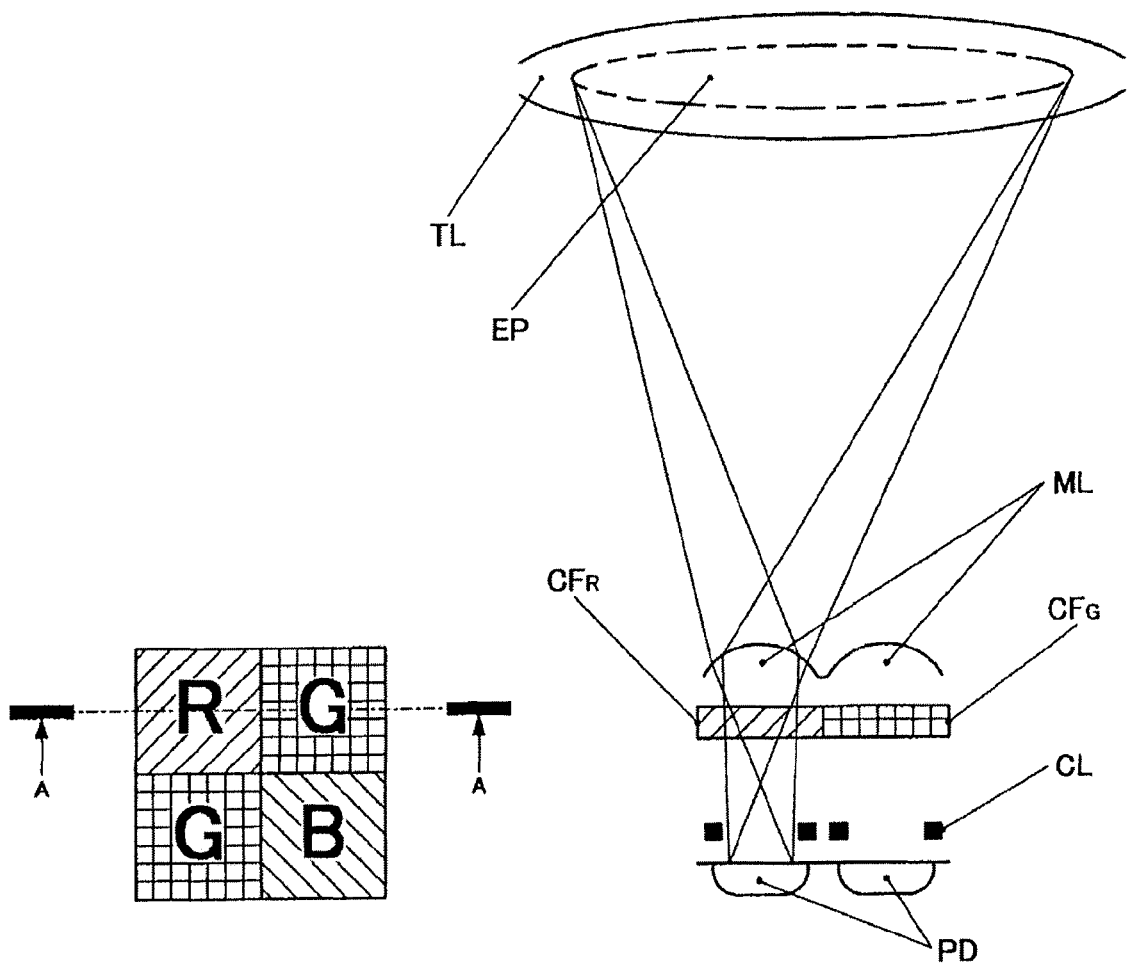
FIGS. 3A and 3B are views for explaining a structure of an image pickup pixel and a focus detection pixel used for the image sensor shown in FIG. 1.

FIG. 3 shows an arrangement and a structure of the image pickup pixels. FIG. 3A is a plan view of 2×2 image pickup pixels. It is well known that in the Bayer arrangement, a pair of G pixels is arranged in the diagonal direction and the R and B pixels are arranged in the other two pixels, and the 2×2 structure is repetitively arranged. FIG. 3B is a sectional view taken along a line A-A in FIG. 3A. ML denotes an on-chip micro lens arranged on the foremost side of each pixel. $CF_R$ denotes a color filter of R (red). $CF_G$ denotes a color filter of G (green). PD (Photo Diode) schematically shows the photoelectric conversion part 201 of the CMOS sensor. CL (Contact Layer) denotes a wiring layer used to form signal lines that transmit a variety of signals in the CMOS sensor. TL (Taking Lens) schematically shows an image pickup optical system.

The on-chip micro lens ML and the photoelectric conversion part PD for the image pickup pixel are configured to take a light beam that has passed the image pickup optical system TL as effectively as possible. The EP (Exit Pupil) of the image pickup optical system TL and the photoelectric conversion part PD have a conjugate relationship with each other via the on-chip micro lens ML and an effective area of the photoelectric conversion part PD is designed to be large. While the incident light beam of the R pixel is illustrated in FIG. 3B, the G pixel and B (blue) pixel have the same structure. Hence, the exit pupil EP corresponding to each of the RGB image pickup pixels have a large aperture, efficiently takes the light beam from the object, and improves a S/N ratio of the image signal. Thus, each of the plurality of image pickup pixels receives the light that passes the whole area of the exit pupil EP, and generates an image of the object.

FIG. 4 shows an arrangement and a structure of the focus detection pixels used to divide the pupil in the horizontal (or lateral) direction of the image pickup optical system TL. The "horizontal direction," as used herein, is a direction orthogonal to the optical axis and parallel to a straight line that extends in the horizontal direction, when the image pickup apparatus is postured so that the optical axis of the image pickup optical system TL and the long side of the image pickup area can be parallel to the ground surface. FIG. 4A is a plane view of the 2×2 pixels containing the focus detection pixel. In obtaining an image signal for recording or enjoying, the G pixel is used to obtain a principal gradient of the brightness information. Since the human image recognition characteristic is sensitive to the brightness information, the image deterioration is likely to be recognized for lack of the G pixel. On the other hand, the R pixel or the B pixel is a pixel used to obtain color (difference) information, and the human vision characteristic is insensitive to the color information. Thus, even when there is a slight loss of the pixel used to obtain the color information, the image degradation is less likely to be recognized. Accordingly, this example maintains the G pixels for the image pickup pixels in the 2×2 pixels, and replaces the R pixel and the B pixel with the focus detection pixels. These focus detection pixels are illustrated as $S_{HA}$ and $S_{HB}$ in FIG. 4A.

FIG. 4B is a sectional view taken along a line A-A in FIG. 4A. The micro lens ML and the photoelectric conversion part PD have the same structures as those of the image pickup pixel shown in FIG. 3B. This example does not use a signal of the focus detection pixel to generate an image, and arranges a transparent (white) film $CF_W$ instead of a color filter for a color separation. In addition, in order to divide the pupil in the image sensor 107, the opening part of the wiring layer CL is biased in one direction with respect to the centerline of the micro lens ML. More specifically, the opening part $OP_{HA}$ of the pixel $S_{HA}$ biases to the right, and receives the light beam that has passed the left exit pupil $EP_{HA}$ of the image pickup optical system TL. The opening part $OP_{HA}$ of the pixel $S_{HB}$ biases to the right, and receives the light beam that has passed the right exit pupil $EP_{HB}$ of the image pickup optical system TL. The pixels $S_{HA}$ are regularly arranged in the horizontal direction, and an object image obtained by these pixels will be referred to as an A image. The pixels $S_{HB}$ are also regularly arranged in the horizontal direction, and an object image obtained by these pixels will be referred to a B image. By detecting relative positions of the A image and the B image, the defocus amount of the object image can be detected. In the pixels $S_{HA}$ and $S_{HB}$, a focus of the object having a brightness distribution in the horizontal direction of the mage pickup area, such as a vertical line, can be detected, but a focus of a horizontal line having a brightness distribution in the vertical direction cannot be detected. Accordingly, this example configures pixels to divide the pupil in the vertical direction (longitudinal direction) of the image pickup optical system so as to provide the focus detection of the latter.

Figure 5B:
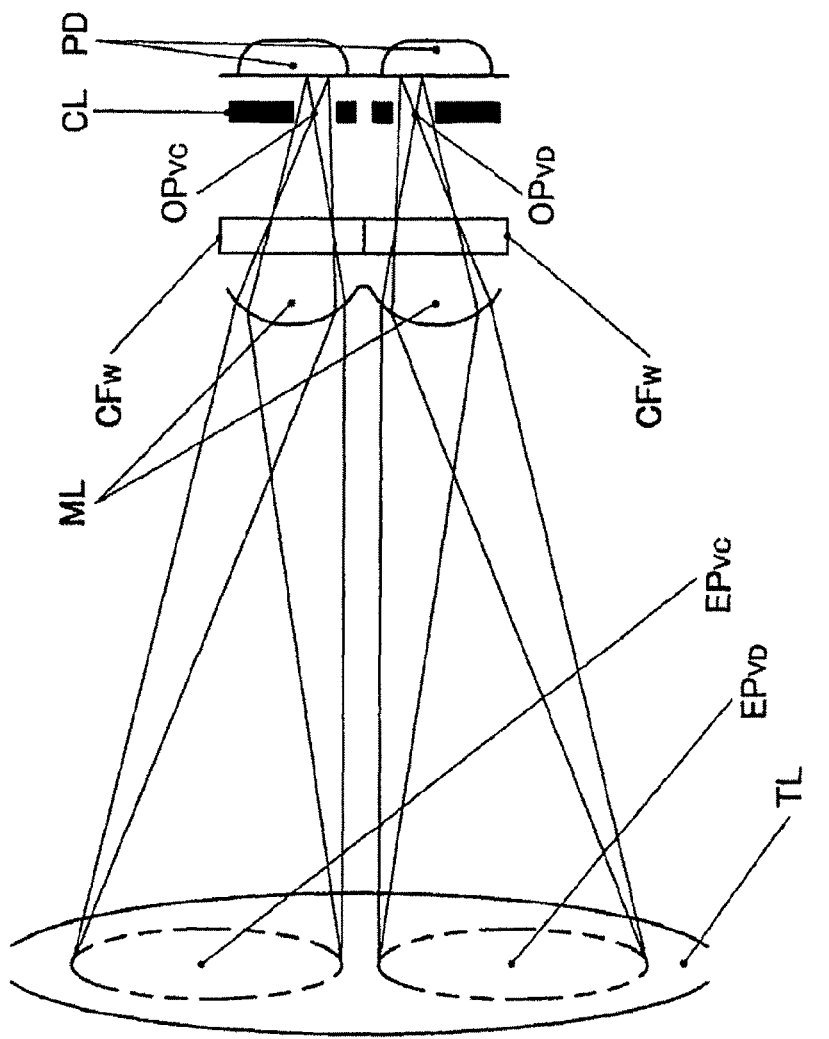
FIGS. 5A and 5B are views for explaining a structure of an image pickup pixel and a focus detection pixel used for the image sensor shown in FIG. 1.
Figure 5A:
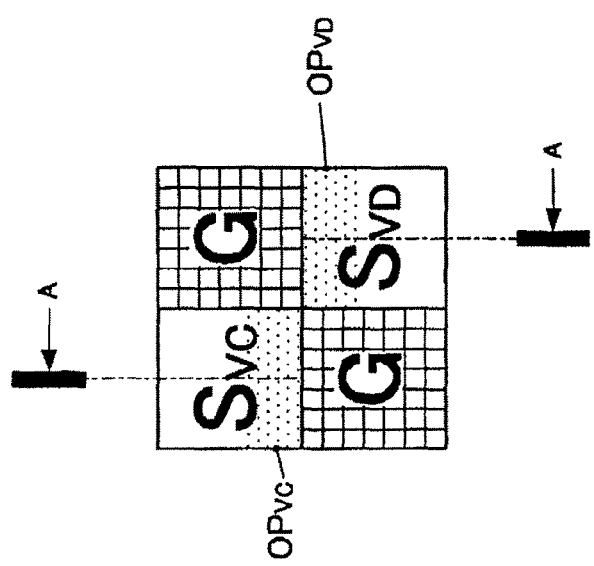

FIG. 5 shows an arrangement and a structure of the focus detection pixels used to divide the pupil in the vertical (or longitudinal) direction of the image pickup optical system TL. The "vertical direction," as used herein, means a direction orthogonal to the optical axis and parallel to a straight line that extends in the vertical direction, when the image pickup apparatus is postured so that the optical axis of the image pickup optical system TL and the long side of the image pickup area can be parallel to the ground surface. FIG. 5A is a plane view of the 2×2 pixels containing the focus detection pixels. Similar to FIG. 4A, the G pixels remain to be image pickup pixels, and the R pixel and the B pixel are replaced with the focus detection pixels. These focus detection pixels are expressed by $S_{VC}$ and $S_{VD}$ in FIG. 5A.

FIG. 5B is a sectional view taken along a line A-A in FIG. 5A. While the pixels in FIG. 4B are configured to divide the pupil in the lateral direction, the pixels in FIG. 5B are configured to divide the pupil in the longitudinal direction but another pixel structure is similar. The opening part $OP_{VC}$ of the pixel $S_{VC}$ biases to the lower side, and receives the light beam that has passed the upper exit pupil $EP_{VC}$ of the image pickup optical system TL. Similarly, the opening part $OP_{VD}$ of the pixel $S_{VD}$ biases to the upper side, and receives the light beam that has passed the lower exit pupil $EP_{VC}$ of the image pickup optical system TL. The pixels $S_{VC}$ are regularly arranged in the vertical direction, and an object image obtained by these pixels will be referred to as a C image. The pixels $S_{VD}$ are also regularly arranged in the vertical direction, and an object image obtained by these pixels will be referred to a D image. By detecting relative positions of the C image and the D image, a defocus amount of the object image having a brightness distribution in the vertical direction can be detected.

Figures 6, 7:
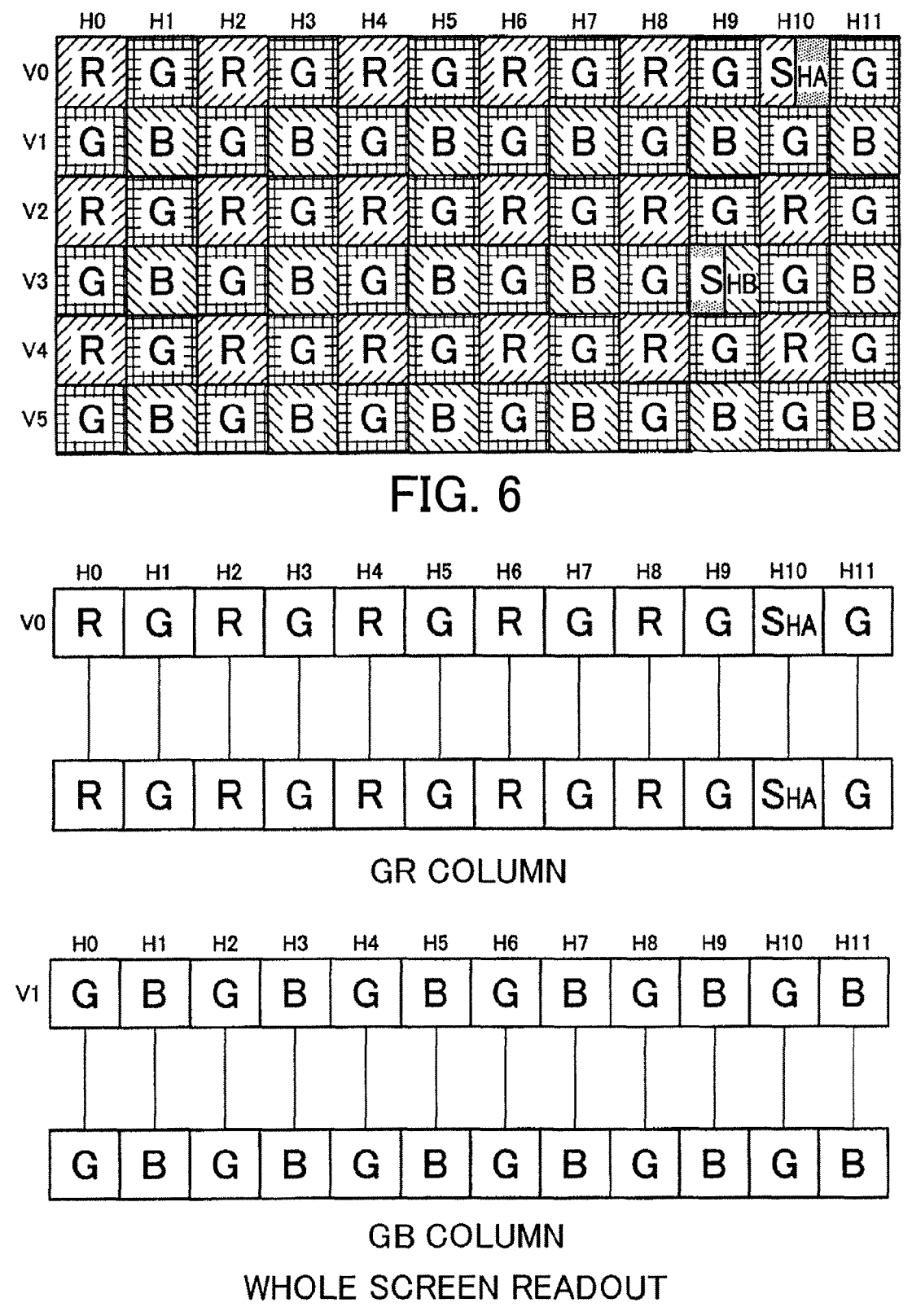

FIG. 6 is a view for explaining one illustrative pixel arrangement in the image sensor 107. This example fundamentally uses the 2×2 Bayer arrangement, and employs a 12×6 pixel pattern as a basic unit, to which a pair of focus detection pixels $S_{HA}$ and $S_{HB}$ is arranged. The 12×6 pixel pattern is one illustrative application of the present invention, and the present invention is not limited to this basic unit of the pixel pattern. FIG. 6 arranges the $S_{HA}$ pixel as a base pixel for the focus detection in the phase difference AF to an address (0, 10), and the $S_{HB}$ pixel as a reference pixel for the phase difference AF to an address (3, 9). The focus detection of the phase difference detection method needs two focus detection pixels, such as a base pixel and a reference pixel. The 12×6 pixel pattern is repetitively arranged in the m×n pixels on the overall surface of the image sensor 107, and this example separates a pair of the base pixel and the reference pixel for the 12×6 pixel pattern. This example thus arranges the minimum number of focus detection pixels for the 12×6 pixel pattern, and can provide a high distribution density of the image pickup pixels, preventing the degradation of the image quality.

Table 1 shows settings of the readout modes of the image sensor 107 according to the example 1. The image sensor 107 of the example 1 has a whole screen readout mode, a skip readout mode, and a mixture readout mode. The whole screen readout mode is used to read signals from all pixels contained in the image sensor 107 for the still image pickup. The skip readout mode is configured to skip part of image pickup pixels and to read signals from the remaining image pickup pixels. The mixture readout mode of this example is configured to mix and read the signals from a plurality of image pickup pixels. The skip readout mode and the mixture readout mode are used in the situation where the frame rate is more important than the image quality as in the motion image pickup mode or the electronic viewfinder mode.

TABLE 1

| | SETTING | | |
|---|---|---|---|
| | SKIP TERMINAL OF HORIZONTAL SCANNER 208 | ADD TERMINAL OF MIXTURE UNIT 205 | AF TERMINALS OF MIXTURE UNIT 205 AND HORIZONTAL SCANNER 208 |
| WHOLE SCREEN READOUT MODE | L | L | — |
| SKIP READOUT MODE | H | L | — |
| MIXTURE READOUT MODE | H | H | — |

Three types of readout modes shown in Table 1 are set by the signal supplied to the SKIP terminal and the ADD terminal from the image sensor driver 124 controlled by the CPU 121. In other words, the settings shown in Table 1 are performed by the CPU 121 based on information stored in a memory (not shown) or a ROM installed in the CPU 121.

FIG. 7 is a view for explaining the whole screen readout, and schematically shows two lines, i.e., V0 and V1 lines initially read in the arrangement shown in FIG. 6. The arrangement on the upper stage corresponds to a pixel part, and the lower stage corresponds to a readout pixel. Initially, the vertical scanner 210 selects the V0 line, and transfers the $H_0$ to $H_{m-1}$ pixel signals as the pixel outputs of the V0 line to the line memory 204. Next, the data input to the PHST terminal is sequentially scanned with transfer pulses of the PH1 terminal and the PH2 terminal so as to drive the horizontal scanner 208, and the $H_0$ to $H_{11}$ switches 206 are sequentially turned on so as to output the pixel signal to the outside via the buffer amplifier 209. In the meanwhile, PHST is used to sequentially turn on the $H_0$ to $H_{m-1}$ switches.

When reading of the V0 line ends, the vertical scanner 210 is driven to select the V1 line, and to transfer the $H_0$ to $H_{m-1}$ pixel signals as the pixel outputs of the V1 line to the line memory 204. Next, the data of the PHST terminal is driven with the transfer pulses of the PH1 terminal and the PH2 terminal so as to operate the horizontal scanner 208, to sequentially turn on the H0 to $H_{m-1}$ switches 206, and to output the pixel signal to the outside via the buffer amplifier 209.

Next, similarly, the vertical and horizontal scanners are driven and all pixel signals of the image sensor are read out.

Figure 8:
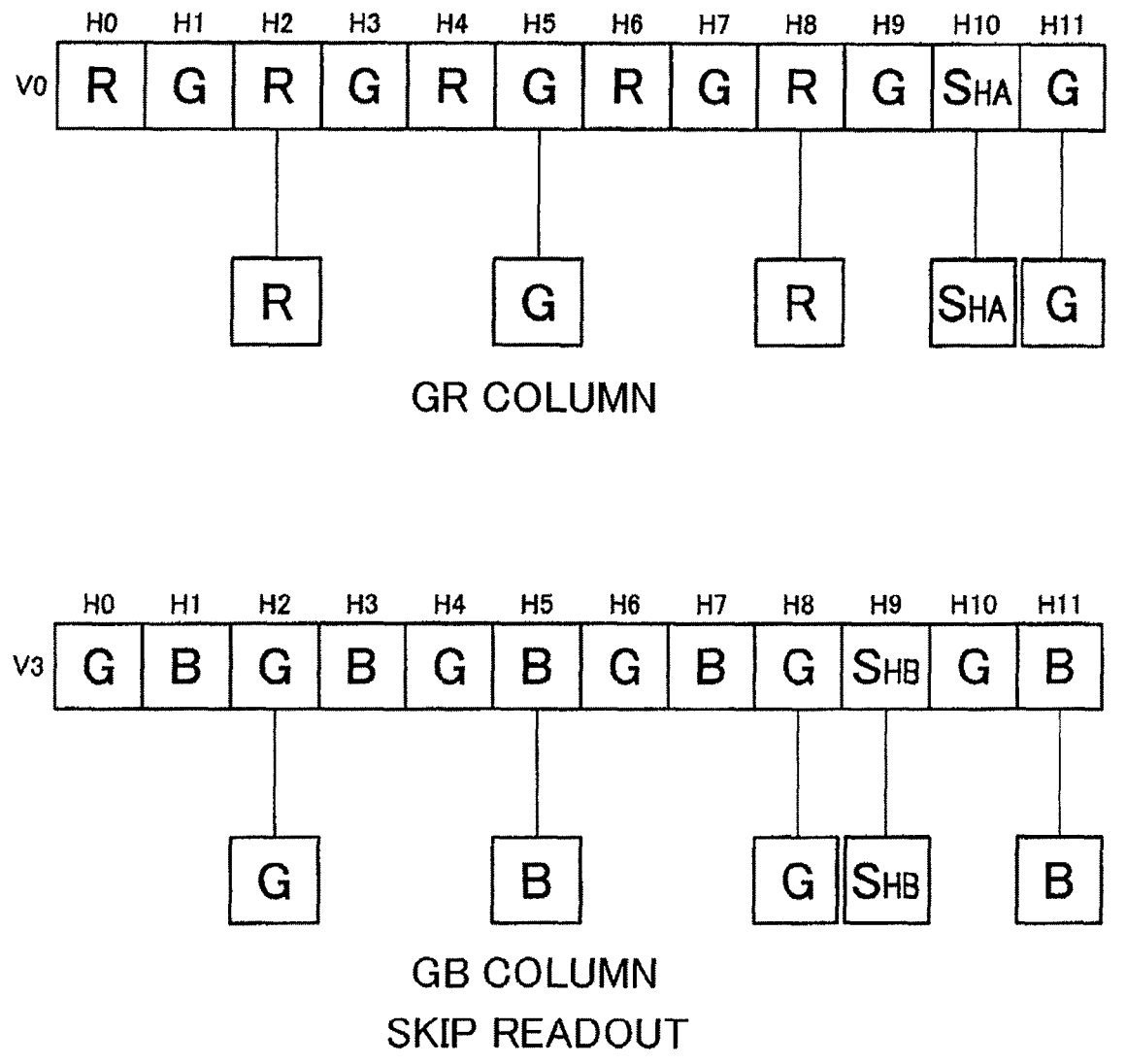

FIG. 8 is a view for explaining the skip readout, and schematically shows two lines, i.e., V0 and V3 lines initially read in the arrangement shown in FIG. 6. The arrangement on the upper stage corresponds to a pixel part, and the lower stage corresponds to the readout pixel.

Initially, in order to perform the skip readout, the SKIP terminal is set to the H level and the ADD terminal is set to the L level in advance to the readout. Next, the vertical scanner 210 selects the V0 line, and transfers the $H_0$ to $H_{m-1}$ pixel signals as the pixel output of the V0 line to the line memory 204. Thereafter, the data input to the PHST terminal is sequentially scanned with transfer pulses of the PH1 terminal and the PH2 terminal so as to drive the horizontal scanner 208. The horizontal scanner 208 scans the switch 206 in order of H2, H5, H8, H10, H11, . . . , due to the setting of the SKIP terminal, and skips the pixel signals and outputs the resultant signal to the outside via the buffer amplifier 209.

When reading of the V0 line ends, the vertical scanner 210 interlaces, selects the V3 line, and transfers the $H_0$ to $H_{m-1}$ pixel signals as the pixel output of the V3 line to the line memory 204. Thereafter, the data input to the PHST terminal is sequentially scanned with the transfer pulses of the PH1 terminal and the PH2 terminal to drive the horizontal scanner 208. At this time, the horizontal scanner 208 scans the switches 206 in order of H2, H5, H8, H9, H11, . . . , by the setting of the SKIP terminal. The pixel signals are skipped and the resultant signal is output to the outside via the buffer amplifier 209.

Next, similarly, while the horizontal and vertical scanners interlace, all m×n screens of the image sensor 107 are skipped and read. The skip readout is used when a higher frame rate is required, for example, for the motion image or the electronic viewfinder.

This example reads H10 for the V0 line and H9 for the V3 line, and can provide a phase difference AF at the skip readout time. H9 of V3 and H10 of V0 form a diagonal relationship shown in FIGS. 4 and 5 due to the interlacing and can provide the phase difference AF. Thereafter, the CPU 121 performs the phase difference AF for the output of the focus detection pixels, calculates a defocus amount, and controls the focus driver 126 such that the third lens unit 105 can be moved to the in-focus position. On the other hand, PTL 1 has a problem in that a focus detection pixel is skipped in the skip readout and the sampling characteristic and the focus detection characteristic deteriorate or the phase difference AF itself fails. This example solves this problem. If no phase difference AF is needed for the skip readout, H10 does not have to be read out of V0 and H9 does not have to be read out of V3.

FIG. 9 is a view for explaining the mixture readout, and schematically shows two lines, i.e., V0 and V3 lines initially read in the arrangement shown in FIG. 6. The arrangement of the upper stage corresponds to the pixel part and the lower stage corresponds to the output of the readout pixel.

Initially, in order to perform the mixture readout, both the SKIP terminal and the ADD terminal are set to the H level in advance to the readout. Next, the vertical scanner 210 selects the V0 line, and transfers the $H_0$ to $H_{m-1}$ pixel signals as the pixel output of the V0 line to the line memory 204. At this time, due to the setting of the ADD terminal, the mixture unit 205 mixes the signals from a plurality of pixels, although when the number of pixels to be mixed is just one, no mixture is made. Basically, a unit of three pixels of the same color is mixed. As shown in FIG. 9, when all mixture objects are the image pickup pixels, three pixels are mixed; when a focus detection pixel is contained in the three pixels, the image pickup pixels are selectively mixed or only the image pickup pixels are mixed. In FIGS. 9, H6 and H8 are image pickup pixels in H6, H8, and H10 and thus are mixed with each other. The focus detection pixel $S_{HA}$ of H10 is not mixed. In addition, the image pickup pixel of H9 is mixed with the image pickup pixels of H11 and H13 (not shown). Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H8, H10, H11, . . . , due to the setting of the SKIP terminal. In addition, it mixes the pixel signals and outputs the resultant signal to the outside via the buffer amplifier 209, and the signal of the focus detection pixel $S_{HA}$ is output singularly.

When reading of the V0 line ends, the vertical scanner 210 interlaces, selects the V3 line, and transfers the $H_0$ to $H_{m-1}$ pixel signals as the pixel output of the V3 line to the line memory 204. At this time, due to the setting of the ADD terminal, the mixture unit 205 mixes the pixels. Basically, a unit of three pixels of the same color is mixed. As shown in FIG. 9, when all mixture objects are the image pickup pixels, all of these pixels are mixed; when a focus detection pixel is contained in the three pixels, the image pickup pixels are selectively mixed or only the image pickup pixels are mixed. In FIG. 9, only H11 and H13 are image pickup pixels among H9, H11, and H13 (not shown), and thus mixed with each other. The focus detection pixel $S_{HB}$ of H9 is not mixed. Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H8, H9, H11, . . . , due to the setting of the SKIP terminal. In addition, it mixes the pixel signals and outputs the resultant signal to the outside via the buffer amplifier 209. The signal of the focus detection pixel $S_{HB}$ is output singularly.

Next, similarly, while the horizontal and vertical scanners interlace, the mixture readout of the image sensor 107 is made. Like the skip readout, the mixture readout is used when a higher frame rate is required, for example, for the motion image or the electronic viewfinder. In addition, the mixture readout can restrain moire that would otherwise occur when the spatial frequency of the object is high, and provides better image quality than the skip reading. The image quality improves as the number of reading pixels increases; when the pixels to be mixed contains a focus detection pixel, the center of gravity position of the mixed pixel slightly shifts, but since the focus detection pixel is arranged in the pixel having color information, this shift is not so conspicuous. The image quality improves when the remaining image pickup pixels except for the focus detection pixels are mixed and used for the image signal rather than when the focus detection pixel is supplemented.

This example reads H10 for the V0 line and H9 for the V3 line, and can provide a phase difference AF at the mixture readout time. H9 of V3 and H10 of V0 form a diagonal relationship shown in FIGS. 4 and 5 due to the interlacing and can provide the phase difference AF. Thereafter, the CPU 121 performs the phase difference AF for the output of the focus detection pixels, calculates a defocus amount, and controls the focus driver 126 such that the third lens unit 105 can be moved to the in-focus position. On the other hand, when PTL 4 is simply applied to PTL 1, the focus detection pixels are mixed with the image pickup pixels and the sampling characteristic and the focus detection characteristic deteriorate or the phase difference AF itself becomes unavailable. This example solves this problem.

As discussed above, this example uses the image sensor having a pixel structure in which some pixels having color information are replaced with the pixels configured to provide the phase difference AF, to read both the image pickup pixels and the focus detection pixels without deteriorating the image quality even in the motion image and electronic viewfinder mode.

Example 2

Table 2 shows settings of the readout modes of the image sensor 107 according to an example 2. The image sensor 107 of the example 2 has a whole screen readout mode similar to that of the example 1, and a skip readout mode similar to that of the example 1. The image sensor 107 of the example 2 has first and second mixture readout mode used to mix and read a plurality of pixels, differently from similar to that of the example 1. The whole screen readout mode is used for the still image pickup, and the skip readout mode and the first and second mixture readout modes are used in the situation where a frame rate is more important than the image quality as in the motion image pickup mode or the electronic viewfinder mode. The first mixture readout mode is a mixture readout mode that does not provide the phase difference AF using the image sensor 107. The second mixture readout is a mixture readout that provides the phase difference AF using the image sensor 107.

TABLE 2

|  | SETTING | | |
| --- | --- | --- | --- |
|  | SKIP TERMINAL OF HORIZONTAL SCANNER 208 | ADD TERMINAL OF MIXTURE UNIT 205 | AF TERMINALS OF MIXTURE UNIT 205 AND HORIZONTAL SCANNER 208 |
| WHOLE SCREEN READOUT MODE | L | L | L |
| SKIP READOUT MODE | H | L | L |
| FIRST MIXTURE READOUT MODE | H | H | L |
| SECOND MIXTURE READOUT MODE | H | H | H |

Four types of readout modes shown in Table 2 are set by the signal supplied to the SKIP terminal, the ADD terminal, and the AF terminal from the image sensor driver 124 controlled by the CPU 121. In other words, the setting shown in Table 2 is performed by the CPU 121 based on information stored in a memory (not shown) inside or outside of the CPU 121.

The whole screen readout and the skip readout are similar to those of the example 1, and a description thereof will be omitted.

FIG. 10 is a view for explaining the first mixture readout, and schematically shows two lines, i.e., V0 and V3 lines initially read in the arrangement shown in FIG. 6. The arrangement on the upper stage corresponds to the pixel part, and the lower stage corresponds to the readout pixel.

Initially, in order to perform the mixture readout, the SKIP terminal and the ADD terminal are set to the H level and the AF terminal is set to the L level in advance to the readout. Next, the vertical scanner 210 selects the V0 line, and transfers the $H_0$ to $H_{m-1}$ pixel signals as the pixel output of the V0 line to the line memory 204. At this time, due to the settings of the ADD terminal and the AF terminal, the mixture unit 205 mixes the pixels. Basically, a unit of three pixels of the same color is mixed. As shown in FIG. 10, when all mixture objects are the image pickup pixels, three pixels are mixed; when a focus detection pixel is contained in the three pixels, the image pickup pixels are selectively mixed or only the image pickup pixels are mixed. In FIGS. 10, H6 and H8 are image pickup pixels in H6, H8, and H10, and thus mixed with each other. The focus detection pixel $S_{HA}$ of H10 is not mixed. In addition, the pixel signal of H9 is mixed with the pixel signals of H11 and H13 (not shown). Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H8, H11, . . . , due to the settings of the SKIP terminal and the ADD terminal, and outputs only the mixed image pickup pixels to the outside via the buffer amplifier 209.

When reading of the V0 line ends, the vertical scanner 210 interlaces, selects the V3 line, and transfers the $H_0$ to $H_{m-1}$ pixel signals as the pixel output of the V3 line to the line memory 204 due to the setting of the SKIP terminal. At this time, due to the settings of the ADD terminal and the AF terminal, the mixture unit 205 mixes the pixels. Basically, a unit of three pixels of the same color is mixed. As shown in FIG. 10, when all mixture objects are the image pickup pixels, all pixels are mixed; when a focus detection pixel is contained in the three pixels, the image pickup pixels are selectively mixed or only the image pickup pixels are mixed. In FIGS. 10, H11 and H13 are image pickup pixels among H9, H11, and H13 (not shown), and thus mixed with each other. The focus detection pixel $S_{HB}$ of H9 is not mixed. Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H8, H11, . . . , due to the settings of the SKIP terminal and the ADD terminal, and outputs only the mixed output of the image pickup pixels to the outside via the buffer amplifier 209.

Next, similarly, while the horizontal and vertical scanners interlace, the mixture readout of the image sensor 107 is made. The number of readout pixels is the same as that of the skip readout when no focus detection pixels are read. In other words, since a focus detection pixel that is not used to take an image is not read in a frame that does not require the focus detection, a horizontal scanning time period can be shortened and the frame rate can be effectively improved.

The first mixture readout mode is different from PTL 1 to which the mixture readout mode described in PTL 4 is simply applied, in that the first mixture readout mode excludes the focus detection pixel from the readout. Thereby, the first mixture readout mode can maintain a high image quality.

FIG. 11 is a view for explaining the second mixture readout, and schematically shows two lines, i.e., V0 and V3 lines initially read in the arrangement shown in FIG. 6. The arrangement of the upper stage corresponds to the pixel part and the lower stage corresponds to the output of the readout pixel.

Initially, in order to perform the mixture readout, each of the SKIP terminal, the ADD terminal, and the AF terminal is set to the H level in advance to the readout. Next, the vertical scanner 210 selects the V0 line, and transfers the $H_0$ to $H_{m-1}$ pixel signals as the pixel output of the V0 line to the line memory 204. At this time, due to the settings of the ADD terminal and the AF terminal, the mixture unit 205 mixes the pixels. Basically, a unit of three pixels of the same color is mixed. As shown in FIG. 11, when all mixture objects are the image pickup pixels, three pixels are mixed;

when a focus detection pixel is contained in the three pixels, the image pickup pixels are not mixed. Since H6 and H8 are image pickup pixels in H6, H8, and H10 and H10 is the focus detection pixel $S_{HA}$ in FIG. 11, no mixture is made. Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H10, H11, . . . , due to the settings of the SKIP terminal and the AF terminal. When all the pixels to be mixed are image pickup pixels, the output of the mixed image pickup pixels is output to the outside via the buffer amplifier 209. When the pixels to be mixed contain a focus detection pixel, only the focus detection pixel is output to the outside via the buffer amplifier 209.

When reading of the V0 line ends, the vertical scanner 210 interlaces, selects the V3 line, and transfers the $H_0$ to $H_{m-1}$ pixel signals as the pixel output of the V3 line to the line memory 204. At this time, due to the settings of the ADD terminal and the AF terminal, the mixture unit 205 mixes the pixels. Basically, a unit of three pixels of the same color is mixed. As shown in FIG. 11, when all mixture objects are the image pickup pixels, all pixels are mixed; when a focus detection pixel is contained in the three pixels, no mixture is made. In FIG. 11, H9 is a focus detection pixel $S_{HB}$ among H9, H11, and H13 (not shown), and thus these three pixels are not mixed with each other. Thereafter, the data input to the PHST terminal is sequentially scanned with the transfer pulses of the PH1 terminal and the PH2 terminal so as to drive the horizontal scanner 208. At this time, the horizontal scanner 208 scans the switches 206 in order of H2, H5, H8, H9, . . . , due to the settings of the SKIP terminal and the AF terminal. When all the pixels to be mixed are image pickup pixels, the output of the mixed image pickup pixels is output to the outside via the buffer amplifier 209. When the pixels to be mixed contain a focus detection pixel, only the focus detection pixel is output to the outside via the buffer amplifier 209. The number of readout pixels is the same as that of the skip readout when no focus detection pixels are read.

Next, similarly, while the horizontal and vertical scanners interlace, the mixture readout of the image sensor 107 is made. In order to maintain the image quality, the focus detection pixel needs to be corrected as a defective pixel. In other words, the CPU 121 supplements the image pickup pixel corresponding to the focus detection pixel in the second mixture readout mode. Therefore, the second mixture readout has slightly inferior image quality to the first mixture readout, but has an advantage in that the reading velocity improves as in the example 1 shown in FIG. 9 because the number of readout pixels does not increase.

This example reads H10 for the V0 line and H9 for the V3 line, and can provide a phase difference AF at the second mixture readout time. H9 of V3 and H10 of V0 form a diagonal relationship shown in FIGS. 4 and 5 due to the interlacing and can provide the phase difference AF. Thereafter, the CPU 121 performs the phase difference AF for the output of the focus detection pixels, calculates a defocus amount, and controls the focus driver 126 such that the third lens unit 105 can be moved to the in-focus position. On the other hand, when PTL 4 is simply applied to PTL 1, the focus detection pixels are mixed with the image pickup pixels and the sampling characteristic and the focus detection characteristic deteriorate or the phase difference AF itself becomes unavailable. This example solves this problem.

This example selects one of the first mixture readout and the second mixture readout for each frame, and thus can read both the image pickup pixel and the focus detection pixel without degrading the image quality even in the motion image and electronic viewfinder mode.

The skip readout of the image sensor 107 in the examples 1 and 2 is not limited to ⅓ skip.

The image pickup apparatus of the present invention is applicable to a cam coder (video camera) for motion image pickup, a variety of types of inspection cameras, surveillance cameras, endoscope cameras, and cameras for robots as well as electronic still cameras.

This application claims the benefit of Japanese Patent Application No. 2008-179905, filed on Jul. 10, 2008, which is hereby incorporated by reference herein in its entirety.

INDUSTRIAL APPLICABILITY

An image pickup apparatus can apply to imaging of an object.

REFERENCE SIGNS LIST 100 digital camera (image pickup apparatus)
105 third lens unit including a focus lens
107 image sensor
121 CPU (controller)
205 mixture unit
208 horizontal scanner
210 vertical scanner

The invention claimed is:
1. An image pickup apparatus comprising:
an image sensor that includes a plurality of first pixels and a plurality of second pixels;
a focus state detector that detects a focus state according to a pair image based on pixel signals from the plurality of second pixels;
a display that displays an image based on pixel signals from the plurality of first pixels; and
a controller configured to control output of signal mixed with the pixel signals in a predetermined row from the image sensor,
wherein the controller controls the output in a frame such that, in mixing and output signal mode, the signals from the predetermined row of the plurality of first pixels are mixed and are output by a scanning circuit, a signal from a second pixel which is included in the predetermined row is not mixed with the plurality of first pixels and second pixels which are included in the predetermined row and is output by the scanning circuit,
wherein the focus state detector detects the focus state according to the pair image based on the pixel signals from the plurality of second pixels without mixing in the frame, and
wherein the display displays the image based on mixed pixel signals from the plurality of first pixels in the frame.

2. The image pickup apparatus according to claim 1,
wherein when the controller does not provide a phase difference focus detection using the image sensor, the controller controls the output such that the second pixels are not read out and the signal from the predetermined row of the plurality of first pixels are mixed with each other and read out, and
wherein when the controller provides the phase difference focus detection using the image sensor, the controller controls the output such that the signal from the plurality of first pixels are not mixed with the signal from the second pixels.

3. The image pickup apparatus according to claim 2, wherein the second pixel is covered partially with a portion for transmitting signal.

4. The image pickup apparatus according to claim 1,
wherein the controller supplements a signal of the second pixel by using signal from the first pixel corresponding to the second pixel.

5. The image pickup apparatus according to claim 1, wherein the controller controls the output such that, in mixing and outputting signals from the plurality of first pixels, the signals from a pair of the second pixels are not mixed with the signal from the first pixels.

6. The image pickup apparatus according to claim 1, wherein the controller controls the output such that the signals from the plurality of first pixels are mixed with each other and read out.

7. The image pickup apparatus according to claim 1,
wherein the controller controls the output such that, in a first mode, the signal from a group of the plurality of first pixels are mixed and the signal from the plurality of second pixels are not mixed, and
wherein the controller controls the output such that, in a second mode, the signals from a group of the plurality of first pixels are not mixed and the signals from the plurality of second pixels are not mixed.

8. The image pickup apparatus according to claim 1, wherein the second pixel is covered partially with a portion for transmitting signal.

9. An image pickup apparatus comprising:
an image sensor that includes a plurality of first pixels and a plurality of second pixels;
a focus state detector that detects a focus state according to a pair image based on pixel signals from the plurality of second pixels;
a display that displays an image based on pixel signals from the plurality of first pixel; and
a controller configured to control output of signal mixed with the pixel signals in a predetermined row from the image sensor,
wherein the controller controls the output in a frame such that, in mixing and output signal mode, the signals from the predetermined row of the plurality of first pixels are mixed and are output via a mixture portion, a signal from a second pixel which is included in the predetermined row is not mixed with the plurality of first pixels and second pixels which are included in the predetermined row and is output via the mixture portion,
wherein the focus state detector detects the focus state according to the pair image based on the pixel signals from the plurality of second pixels without mixing in the frame, and
wherein the display displays the image based on mixed pixel signals from the plurality of first pixels in the frame.

10. The image pickup apparatus according to claim 9,
wherein when the controller does not provide a phase difference focus detection using the image sensor, the controller controls the output such that the second pixels are not output and the signals from the predetermined row of the plurality of first pixels are mixed with each other and read out, and
wherein when the controller provides the phase difference focus detection using the image sensor, the controller controls the output such that the signals from the plurality of first pixels are not mixed with the signal from the second pixels.

11. The image pickup apparatus according to claim 10, wherein the second pixel is covered partially with a portion for transmitting signal.

12. The image pickup apparatus according to claim 9,
wherein the controller supplements a signal of the second pixel by using signal from the first pixel corresponding to the second pixel.

13. The image pickup apparatus according to claim 9, wherein the controller controls output such that, in mixing and output signal from the plurality of first pixels, the signals from a pair of the second pixels are not mixed with the signal from the first pixels.

14. The image pickup apparatus according to claim 9, wherein the controller controls the output such that the signals from the plurality of first pixels are mixed with each other and output.

15. The image pickup apparatus according to claim 9,
wherein the controller controls the output such that, in a first mode, the signals from a group of the plurality of first pixels are mixed and the signals from the plurality of second pixels are not mixed, and
wherein the controller controls the output such that, in a second mode, the signals from a group of the plurality of first pixels are not mixed and the signals from the plurality of second pixels are not mixed.

16. The image pickup apparatus according to claim 9, wherein the second pixel is covered partially with a portion for transmitting signal.

17. A control method of an image pickup apparatus including an image sensor that includes a plurality of first pixels and a plurality of second pixels, detecting a focus state according to a pair image based on pixel signals from the plurality of second pixels, and displaying an image based on pixel signals from the plurality of first pixels, said control method comprising controlling output in a frame such that, in mixture readout of pixel signals, the signals from a predetermined row of the plurality of first pixels are mixed and are output by a scanning circuit, and a signal from a second pixel which is included in the predetermined row is not mixed with the plurality of first pixels and second pixels which are included in the predetermined row and is output by the scanning circuit, wherein the focus state is detected according to the pair image based on the pixel signals from the plurality of second pixels without mixing in the frame, and the image is displayed based on mixed pixel signals from the plurality of the first pixels in the frame.

18. A control method of an image pickup apparatus including an image sensor that includes a plurality of first pixels and a plurality of second pixels, detecting a focus state according to a pair image based on pixel signals from the plurality of second pixels, and displaying an image based on pixel signals from the plurality of first pixels, said control method comprising controlling output in a frame such that, in mixture output of pixel signals, the signals from a predetermined row of the plurality of first pixels are mixed and are output via a mixture portion, and a signal from a second pixel which is included in the predetermined row is not mixed with the plurality of first pixels and second pixels which are included in the predetermined row and is output via the mixture portion, wherein the focus state is detected according to the pair image based on the pixel signals from the plurality of second pixels without mixing in the frame, and the image is displayed based on mixed pixel signals from the plurality of the first pixels in the frame.

* * * * *